3,278,266
VAPOR PHASE SEPARATION OF HYDROGEN HALIDES FROM HYDROCARBONS
Lester M. Welch, Seabrook, and Harlan B. Johnson and William H. Taylor, Houston, Tex., assignors to Petro-Tex Chemical Corporation, Houston, Tex., a corporation of Delaware
No Drawing. Filed May 13, 1963, Ser. No. 280,149
5 Claims. (Cl. 23—154)

This invention relates to an improved process for the vapor phase separation of hydrogen halides. More specifically, this invention relates to an improved vapor phase process for removing and recovering hydrogen halides from hydrocarbon mixtures.

Mixtures which contain hydrogen halides and hydrocarbons may be obtained as by-products from a number of halogen-hydrocarbon reactions, for example, halogen substitution reactions, dehydrohalogenation reactions, and halogen catalyzed dehydrogenation reactions. In all of these reactions, it is generally desired that the hydrogen halide by-products obtained therefrom be recovered for purposes of either recycle or for use in other chemical processes. Various methods have been tried for separating and recovering these hydrogen halide by-products. Some of these methods are operated in the liquid phase requiring that the hydrocarbon-hydrogen halide mixture be first liquified before the hydrogen halide separation process can be accomplished. This liquification step is costly and time consuming and includes the possibility of halogenating and/or polymerizing the hydrocarbon products prior to or during the separation process.

To avoid the difficulties of liquid phase separation, several vapor phase methods have been proposed. One vapor phase method for separating hydrogen halides from hydrocarbon-hydrogen halide mixtures is by absorption of hydrogen halides at elevated temperatures on charcoal. The charcoal absorption method has been ineffective at high and low temperatures, particularly where the hydrogen halide mixture included hydrocarbons containing three or more carbon atoms. At low temperatures the hydrocarbons and the hydrogen halides were absorbed by the charcoal, while at high temperatures absorption of hydrogen halides was incomplete. Another vapor phase method suggested utilizes an alkali metal oxide in separating the hydrogen halide. When vaporized hydrogen halide mixtures are passed through a packed column containing granules of an alkali metal oxide at elevated temperatures, the recovery of the hydrogen halide is incomplete because of melting or decomposition of the salt or salt hydrate formed. In the alkali oxide system, melting of the alkali halide compounds is a serious problem, particularly when steam is present in the vaporized hydrogen halide mixture thereby causing processing difficulties, less efficient removal of hydrogen halides, plugging of equipment, etc.

Of all the methods for separating hydrogen halides, and particularly for separating hydrogen halides from hydrogen halide-hydrocarbon mixtures, the vapor phase removal process would be the most efficient and economical, if a practical recovery step was made available. It is therefore an object of this invention to provide an economic and efficient vapor phase process for the separation of hydrogen halides. A further object is to provide an economic and efficient vapor phase process for the separation and recovery of hydrogen halides from hydrocarbon mixtures. Still another object of this invention is to provide a vapor phase process that lends itself easily and quickly to a regeneration step of alkali metal compounds and recovery of the hydrogen halide as either the hydrogen halide or as the elemental halogen.

These objects are accomplished by contacting at a temperature above 100° C. and less than 300° C. a vaporized hydrogen halide mixture with a diacid base deposited on a highly porous acid resistant support and recovering the hydrogen halide therefrom at a higher temperature. It was unexpectedly found that the process of this invention not only did not have the disadvantages associated with the packed alkali column or the charcoal absorption processes, but was also more effective than either. Prior to this invention the charcoal absorption process was ineffective at temperatures above 100° C. and was also ineffective at lower temperatures when the hydrogen halide mixture included heavier hydrocarbons. The use of towers packed with alkali metal oxides was totally ineffective at temperatures between about 100° C. and 300° C. because of the formation of low melting hydrate type compounds from reaction of the hydrogen halide and the alkaline compound which would melt and flow and, thus, cause operating problems.

In contrast and in accordance with this invention, hydrogen halides are effectively removed from hydrocarbon mixtures at temperatures of above 100° C. to less than 300° C. with no loss of alkaline compounds and no operating difficulties.

A variety of hydrogen halide mixtures may be separated by this invention. In addition to the hydrogen halide which may be present either in large or trace concentrations, the mixture may contain a hydrocarbon including, for example, any of the following hydrocarbons or combinations thereof; saturated or unsaturated hydrocarbons such as ethane, ethylene, propane, propylene, butane, butene-1, butene-2, isobutylene, isopentane, n-pentane, 2-methylbutene-1, 2-methylbutene-2, methyl pentene, heptene, octene, and the like; diolefins and acetylenic compounds such as butadiene, isoprene, vinyl acetylene, acetylene and the like may also be included. In addition to the saturated and unsaturated hydrocarbons there are numerous types of substituted hydrocarbon compounds that may be present in admixture with hydrogen halides such as carbonyls, amines, alcohols, organic acids, esters, ethers and the like. A typical hydrogen halide-hydrocarbon mixture containing some of these compounds include, for example, a mixture comprising approximately 1 part hydrocarbon, 13 parts steam, 2 parts inert gas, and 0.5 part hydrogen halide. The inert gas is normally nitrogen while the hydrocarbon is comprised of 72 mol percent butadiene, 19 mol percent butene-2, and butene-1, 2 mol percent butane, and 2 mol percent total of ethylene, ethane, and methane. This hydrogen halide-hydrocarbon mixture is readily treated in accordance with this invention to remove the hydrogen halide with neither losses nor operating difficulties caused by melting of alkaline compounds.

Although any of the hydrogen halides such as hydrogen chloride, hydrogen fluoride, hydrogen iodide, and hydrogen bromide may be separated by this invention, certain of these hydrogen halides such as hydrogen bromide and hydrogen iodide are more easily adapted to the operation of this invention. The operation of this invention is not affected by the hydrogen halide concentration in the hydrogen halide-hydrocarbon mixture. Mixtures in which the hydrogen halide concentration is as high as 99 mol percent and as low as 0.001 mol percent have been effectively separated by this invention. For example, a vaporized aqueous solution containing a hydrogen halide concentration of about 10 percent and only a trace of hydrocarbon has been successfully separated and the hydrogen halide recovered.

Although any of the diacid bases selected from Group IIa of the Periodic Table may be deposited on the porous support and utilized in this invention, certain of these bases are preferred. A diacid base is defined as a base which, for its complete neutralization, requires two molecules of a monobasic acid. For example, the diacid bases of magnesium, calcium, strontium, and barium in the form of their respective oxides or hydroxides give excellent results. The diacid bases may be deposited on the porous supports in a variety of ways. For example, salts such as calcium iodide or calcium bromide may be deposited on the support as an aqueous slurry and oxidized to the oxide. If preferred, the oxide and/or the hydroxide of the diacid base may be deposited directly on the support. The carbonates, sulfites, and nitrates of these alkaline earth metals, as well as any other type of compound that may be converted to the oxide or hydroxide may be used. The amount of diacid base deposited on the porous support may be varied over wide limits. Generally the alkaline earth base or the diacid base deposited will be between 5 percent to 20 percent by weight of the porous support, however, amounts as high as 35 percent and as low as 1 percent may be used. The amount of alkaline earth compound normally used will be less than that which will completely fill all of the pores of the support.

The diacid base may be deposited on a variety of supports, however, porous supports having a bulk density of between 35 and 120 pounds per cubic foot, a specific gravity of between 2.5 and 4, a surface area of between less than 1 to about 450 square meters per gram and pore diameters of between 30 and 100 microns are preferred. Porous supports having a bulk density of between 40 and 75 pounds per cubic foot, a specific gravity of between 2.9 and 3.5, a surface area of between 250 and 380 square meters per gram, and pore diameters of between 50 and 70 microns were most effective and are still further preferred. Typical porous supports that may be utilized to good advantage in this invention include, for example, silica, silica alumina, titanium gel, zirconia gel, activated alumina and the like.

Although the hydrogen halide separation process may be conducted at subatmospheric or superatmospheric pressures, the process is generally conducted at atmospheric pressures. Pressures as high as 15 atmospheres and as low as 0.1 atmosphere have been utilized to advantage.

Residence times required for the separation of hydrogen halides may be varied over wide limits. Residence times as high as 10 seconds and as low as 0.05 second have been utilized. Residence times between about 2 seconds to 0.1 second and preferably between 0.8 and 0.3 second have given good results, and are the most desirable. The longer residence times are generally employed when the hydrogen halide is a minor component of the mixture. Residence time is the calculated dwell time the hydrogen halide spends in the alkali metal packed area at reaction temperatures and pressures, assuming that the volume of hydrogen halide remains constant.

The reactors employed in the operation of this invention may be designed in a variety of shapes and sizes. Generally, packed columns of sufficient length and width to allow for easy and efficient separation of the hydrogen halide and which may be easily charged and emptied are preferred. Obviously any designed reactor that would create excessive flow restrictions, a back pressure, or which would hinder the efficient separation of the hydrogen halides should be avoided.

The following examples are only illustrative of the manner is which the process of this invention may be carried out and are not intended to be limiting.

Example 1

100 grams of H–151 [1] activated alumina having a surface area of 350 square meters per gram, a bulk density of 52 pounds per cubic foot and a specific gravity of about 3.2 was dried at 400° C. for about three hours. A fifty percent solution of calcium iodide was added to the activated alumina and evaporated to dryness. The activated alumina, impregnated with calcium iodide, was then placed in a furnace at 400° C. in the presence of air and oxidized to calcium oxide. The coated alumina was then screened to remove any loose calcium oxide and weighed. The activated alumina contained 10 grams of calcium oxide. 35 cc. of the treated alumina was placed in a 12-inch, 17 mm. I.D. Vycor [2] reactor equipped with an upright thermowell passing through the center of the reactor. Vycor Raschig rings approximately ¼ inch x ¼ inch were used to support the bed. A small amount of the Vycor rings was also used as a preheat. The Vycor reactor was then placed in a temperature controlled electric furnace and heated to a temperature of 160° C. to 180° C. An aqueous solution of hydrogen iodide (approximately 10 percent by weight) was pumped into the reactor at a rate approximating 0.7 to 1.0 cc./min. The hydrogen iodide was vaporized in the preheat section of the reactor and passed through the activated alumina-calcium oxide bed at 160° C. to 180° C. A flow of nitrogen gas approximating 600 cc./min. was also introduced into the reactor to control the residence time. The reaction effluent was then passed into a water scrubber equipped with a pH meter and the efficiency of the system determined. No hydrogen iodide was detected in the effluent. After 15.4 grams of hydrogen iodide had been absorbed on the treated alumina, the hydrogen iodide feed was stopped and the reactor temperature increased to above 300° C. A steady flow of superheated steam was then introduced and hydrogen iodide was liberated. The liberated hydrogen iodide was collected in a water scrubber and titrated with a solution of 0.1 N NaOH. By a material balance over 99.9 percent of the hydrogen iodide as hydrogen iodide was accounted for. There was no melting or loss of calcium compounds in the bed.

Example 2

Example 1 was repeated with the exception that the hydrogen iodide mixture was passed over small chips of calcium carbonate rather than over a porous support impregnated with a diacid base. During the run, a heavy liquid material containing iodide (assumed to be low melting hydrate) flowed from the absorber bed. After about 15 minutes the reactor outlet was blocked and the run was discontinued. The reactor was dismantled and the absorber bed examined. It was found that the absorber bed contained substantial quantities of this viscous liquid material. The problems encountered in the above example were completely eliminated as is shown in Example 1 when the diacid base was deposited on the particular porous support. In Example 1 there was neither reactor blocking nor a loss of iodine as was encountered in Example 2.

Example 3

Example 1 was repeated with 10 grams of calcium hydroxide deposited on 100 grams of the activated alumina from an aqueous slurry and dried. The results obtained were identical to those obtained in Example 1. The above example was also repeated with hydrogen bromide instead of hydrogen iodide. Similar results were obtained. This example was then repeated with the exception that the porous support containing the alkali ---
[1] H–151 type activated alumina is manufactured by the Aluminum Company of America.
[2] The term Vycor is the trademark for a glass manufactured by Corning Glass Works. It is comprised of approximately 96 percent silica which has been chemically washed and then fired at high temperatures.

bromide was treated with a stream of air instead of steam at a temperature of about 350° C. 99.5 percent of the initial hydrogen bromide was recovered as elemental bromine.

*Example 4*

A hydrogen halide-hydrocarbon mixture of the following composition

|  | Mols |
|---|---|
| Steam | 20.0 |
| Nitrogen | 8.168 |
| CO | 0.093 |
| $CO_2$ | 0.186 |
| n-Butane | 0.055 |
| Butene-1 | 0.085 |
| Butene-2 trans | 0.165 |
| Butene-2 cis | 0.128 |
| Butadiene | 2.895 |
| Acetylenes | 0.025 |
| Hydrogen iodide | 0.050 | was passed through the Vycor reactor of Example 1 at a rate of 1800 cc./min. under operating conditions identical to those in Example 1. The reactor effluent was passed through a water scrubber and analyzed. There was no evidence of hydrogen iodide present in the reactor effluent. The reactor was then heated to about 350° C. and superheated steam introduced. The hydrogen iodide liberated was collected. 99.9 percent of the hydrogen iodide fed to the absorber-reactor was recovered.

We claim:

1. A process for the vapor phase separation of hydrogen halides other than hydrogen fluoride from hydrocarbons and steam which comprises forming a reaction product by contacting the said hydrogen halide at a temperature between above 100° C. to less than 300° C. with a Group IIa diacid base impregnated on a porous support, the said support having a bulk density of between 35 and 120 pounds per cubic foot, a specific gravity of between 2.5 and 4 and a surface area of between less than 1 to 450 square meters per gram.

2. The process of claim 1 wherein the IIa metal compound is selected from the group consisting of oxides and hydroxides of calcium, magnesium, and barium, and the hydrogen halide is selected from the group consisting of hydrogen bromide and hydrogen iodide.

3. The process of claim 1 wherein the bulk support has a pore diameter between about 30 to 100 microns.

4. The process for separating the hydrogen halide selected from the group consisting of hydrogen iodide and hydrogen bromide from admixture of aliphatic hydrocarbons and steam containing from 2 to 8 carbon atoms which comprises passing the mixture of hydrocarbon and hydrogen halide at a temperature between about 130° C. and 250° C. over a basic calcium compound deposited impregnated on activated alumina having a bulk density of greater than 35 and less than 120 pounds per cubic foot and pore diameter between about 50 and 70 microns in diameter.

5. The process of claim 1 wherein after the said contacting the said hydrogen halide is regenerated by heating the said reaction product to a temperature above 300° C.

References Cited by the Examiner

UNITED STATES PATENTS

| 2,282,712 | 5/1942 | Engs et al. | 23—154 X |
| 2,389,457 | 11/1945 | Pines et al. | 23—154 |
| 2,919,174 | 12/1959 | Pring | 23—154 X |

OSCAR R. VERTIZ, *Primary Examiner.*

MAURICE A. BRINDISI, BENJAMIN HENKIN,
*Examiners.*

E. STERN, *Assistant Examiner.*